United States Patent
Akins, III et al.

(10) Patent No.: US 9,100,548 B2
(45) Date of Patent: Aug. 4, 2015

(54) FEATURE ENABLEMENT AT A COMMUNICATIONS TERMINAL

(75) Inventors: Glendon L. Akins, III, Fort Collins, CO (US); Jay C. McMullan, Jr., Atlanta, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1739 days.

(21) Appl. No.: 12/174,832

(22) Filed: Jul. 17, 2008

(65) Prior Publication Data

US 2010/0017840 A1    Jan. 21, 2010

(51) Int. Cl.
*H04N 7/173* (2011.01)
*H04L 9/00* (2006.01)
*H04N 7/167* (2011.01)
*H04N 21/443* (2011.01)
*H04N 7/16* (2011.01)
*H04K 1/00* (2006.01)

(52) U.S. Cl.
CPC ........... *H04N 7/1675* (2013.01); *H04N 21/443* (2013.01)

(58) Field of Classification Search
USPC ........ 725/31, 25, 132, 140, 152, 28; 719/327; 712/248, 300
See application file for complete search history.

(56) References Cited

U.S. PATENT DOCUMENTS

| | | | |
|---|---|---|---|
| 6,516,412 B2 | 2/2003 | Wasilewski et al. | |
| 6,971,008 B2 | 11/2005 | Wasilewski et al. | |
| 7,047,405 B2 * | 5/2006 | Mauro | 713/166 |
| 7,165,268 B1 * | 1/2007 | Moore et al. | 726/2 |
| 7,328,455 B2 | 2/2008 | Jutzi et al. | |
| 7,353,385 B2 | 4/2008 | Nakano et al. | |
| 7,546,618 B2 * | 6/2009 | Bacon | 725/25 |
| 8,079,043 B2 * | 12/2011 | Kahn et al. | 725/25 |
| 2004/0127196 A1 * | 7/2004 | Dabbish et al. | 455/411 |
| 2005/0005286 A1 * | 1/2005 | Koskela et al. | 725/31 |
| 2006/0156392 A1 * | 7/2006 | Baugher | 726/5 |
| 2007/0174621 A1 * | 7/2007 | Ducharme | 713/176 |
| 2008/0168524 A1 | 7/2008 | Wood | |
| 2009/0165111 A1 * | 6/2009 | Zhang et al. | 726/9 |
| 2009/0204808 A1 * | 8/2009 | Guo et al. | 713/155 |

FOREIGN PATENT DOCUMENTS

| | | |
|---|---|---|
| WO | WO2006/031203 A1 | 3/2006 |
| WO | WO 2010/008550 | 1/2010 |

OTHER PUBLICATIONS

International Search Report for PCT/US2009/004096, Mar. 18, 2010.
PCT Notification Concerning Transmittal of International Preliminary Report on Patentability (1 page), International Preliminary Report on Patentability (1 page), and Written Opinion of the International Searching Authority (5 pages) mailed Jan. 27, 2011 for PCT/US2009/004096.

* cited by examiner

*Primary Examiner* — Pankaj Kumar
*Assistant Examiner* — Reuben M Brown
(74) *Attorney, Agent, or Firm* — Patent Capital Group

(57) ABSTRACT

In one embodiment, a method for electronic enablement of features at a communication device that includes receiving a feature token, validating the feature token, and changing the enablement state of one or more features at the communication device in accordance with a valid feature token.

26 Claims, 16 Drawing Sheets

FEATURE ENABLEMENT AT A COMMUNICATIONS TERMINAL

TECHNICAL FIELD

The present disclosure relates generally to communication devices, and more particularly, to enablement of features at a communication device.

BACKGROUND OF INVENTION

Communications networks continue to expand and enhance the services provided to an ever-increasing consumer base. In the television realm, subscriber networks have moved beyond original one-way television services to two-way transmissions that allow a subscriber to transmit requests from his home communications terminal (HCT). HCTs, typically embodied as television set-top boxes (STBs), can perform both analog and digital operations to provide a broad array of features and services such as Near Video on Demand (NVOD), Video on Demand (VOD) and Pay Per View (PPV). Contemporary STBs typically include Application Specific Integrated Circuits (ASICs) designed to perform a specific function or set of functions. A feature at an STB, such as an MPEG-2 codec, used to support the services offered by the service provider is typically implemented by an ASIC. The circuitry required to implement these features is usually licensed from third-party licensors. An STB may include several distinct ASICs, each representing a licensed feature, or may include a large ASIC in which feature circuitry licensed from one or more licensors is combined. A large ASIC, providing nearly all the functionality of the STB, can be provided on a single chip, referred to as a System on Chip (SoC).

A network operator will often provide a first set of services to subscribers in a first operating region, and a second set of services to subscribers in a second operating region. Because third-party license fees for the STB features required to implement the services can constitute a significant portion of the cost of an STB, it is prudent to include on an STB, and thus pay licensing fees for, only those features that may actually be used in an operating region. An STB manufacturer may choose to spin different ASICs for STBs destined for different operating regions. However, the high Non-Recurring Engineering (NRE) cost associated with ASIC development, coupled with the large number of possible codec combinations that may be requested by a system operator, can make spinning different ASICs for STBs intended for different operating regions prohibitively expensive.

As an alternative, an STB manufacturer can provide circuitry for all the licensed features to all its STBs then selectively disable those features associated with services that will not be offered by the network operator. For example, a fuse associated with the feature can be blown to disable the feature. As a result, third-party license fees for those features need not be paid. Typically, software that supports the features that remain enabled is loaded onto the STB prior to providing the STB to the purchaser. Thus, fully functional STBs can be provided for an intended operating region, while at the same time payment of license fees can be limited to fees associated with those features physically enabled at the STB.

DESCRIPTION OF EXAMPLE EMBODIMENTS

Overview

In a first example, a system includes: a secure feature token generator for generating and transmitting a feature token; and a communications device communicatively coupled to the feature token generator, the communication device having a secure processor for validating the feature token and changing an enablement state of underlying hardware for a feature at the communication device in response to determining that the feature token is valid.

In a second example, a feature token generator includes: a secure processor for generating a feature token having enablement status information for at least one feature at a communication device, and a database for storing information pertaining to the communication device.

In a third example, a method includes generating a feature token having enablement status information for at least one feature at a communication device, and transmitting the feature token to the communication device.

In a fourth example, a method includes receiving a feature token request from a communication terminal, receiving an identity certificate from the communication terminal, validating the identity certificate, and transmitting a feature token to the communication terminal.

In a fifth example, a communication device includes: a secure processor for validating a feature token and for changing the enablement state of the underlying hardware that implements a feature at the communication device, wherein the secure processor is configured to change the enablement state in response to the feature token being found valid.

In a sixth example, a method of the invention includes receiving a feature token at a communication terminal, validating the feature token at a secure processor at the communication terminal, and, in response to a determination that the feature token is valid, changing an enablement state of underlying hardware for a feature at the communication terminal in accordance with the feature token.

As required, example embodiments of the invention are presented herein. Structures of apparatus and sequences of method operations are set forth to provide a thorough understanding of the invention. However, the examples set forth herein are not intended to be limiting, since it will be apparent to those skilled in the art that the examples can be modified in the practice of the invention. In some instances electrical structures and circuits are shown in block diagram form to better point out novel aspects and avoid obscuring the invention. For teaching purposes, the invention is discussed in the context of a cable television system, however it is contemplated that the invention can be practiced in various communication systems to enable features at a variety of communication devices. Similarly, the terms communication device and communication terminal are used interchangeably to refer to apparatus capable of conducting communications, and as such, are not limited to the example embodiments described herein.

Figure 1:
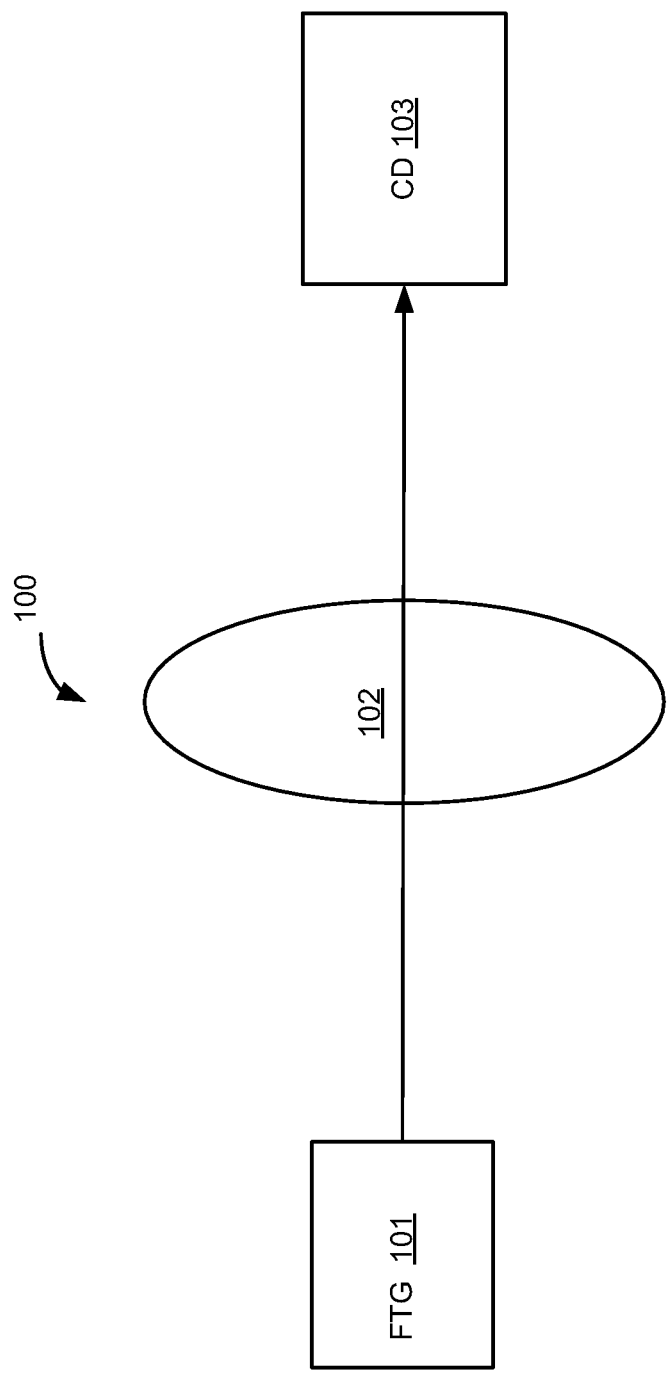
FIG. 1 is an example of a system of the invention.

Turning now to the drawings, wherein like numerals refer to like elements throughout the views, FIG. 1 depicts a block diagram of a first example embodiment of the invention, shown here in the form of a system 100. The system 100 includes a feature token generator (FTG) 101, and a communication device (CD) 103, communicatively coupled to the FTG 101 by transmission medium 102. The FTG 101 can generate and transmit a secure feature token that can be delivered to the CD 103 by the transmission medium 102. A secure processor at the CD 103 can validate the feature token and change the enablement state of a feature at the CD 103 in accordance with the feature token. Thus, an enablement state of underlying hardware at the CD 103 can be changed via a secure electronic feature enablement process.

Figure 2:
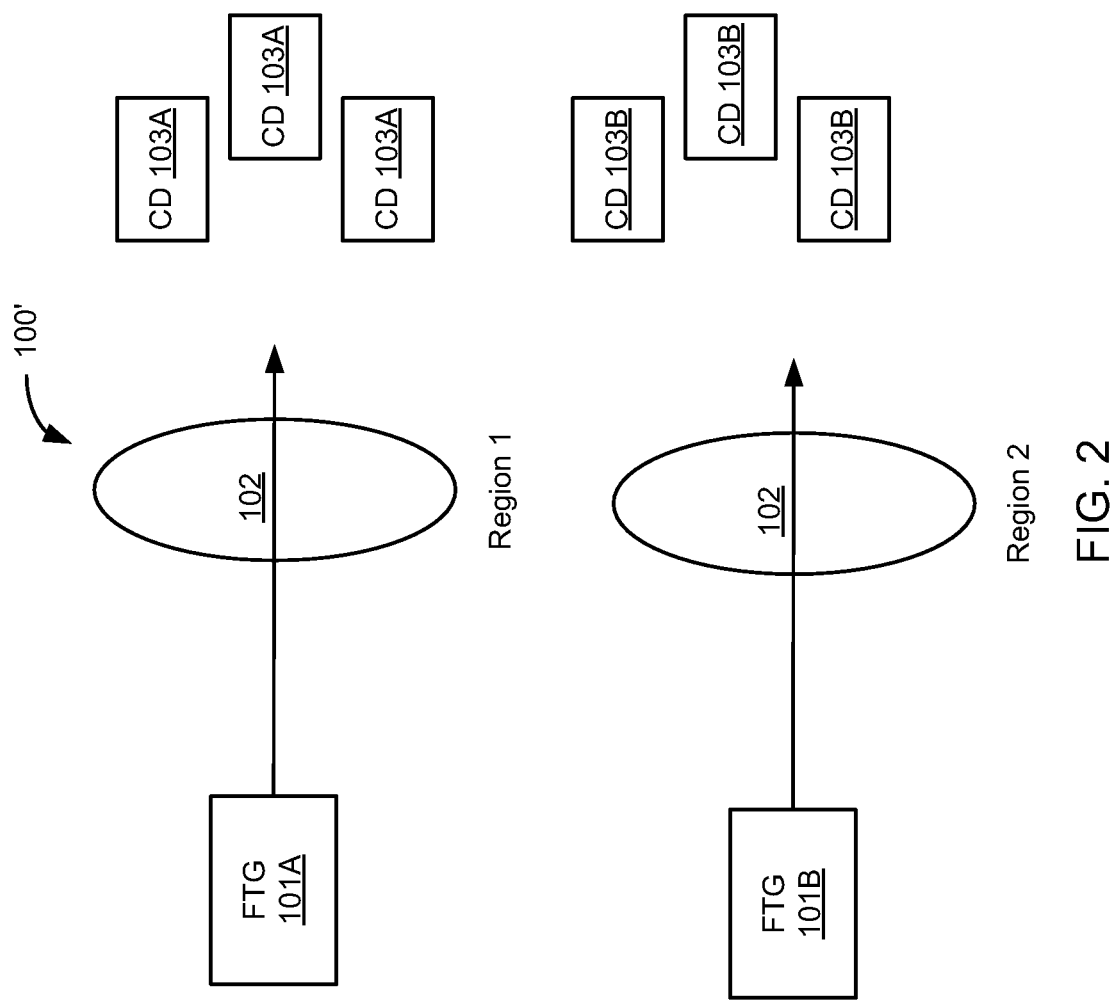
FIG. 2 is an example of a system of the invention.

FIG. 2A shows an example of a system in which a system operator provides transmission media and communication terminals in two different regions, Region 1 and Region 2. The network operator provides a first set of services in Region 1 and a second set of services in Region 2. Accordingly, a feature token transmitted by FTG 101A can be used to enable a first set of features at the CD 103A and a feature token transmitted by FTG 101B can be used to enable a second set of features at the CD 103B. FIG. 2 depicts Regions 1 and 2 as having separate FTGs and transmission media 102, however the invention is not subject to such limitation, as it is contemplated that different operating regions may share transmission media and/or FTGs.

Figure 3:
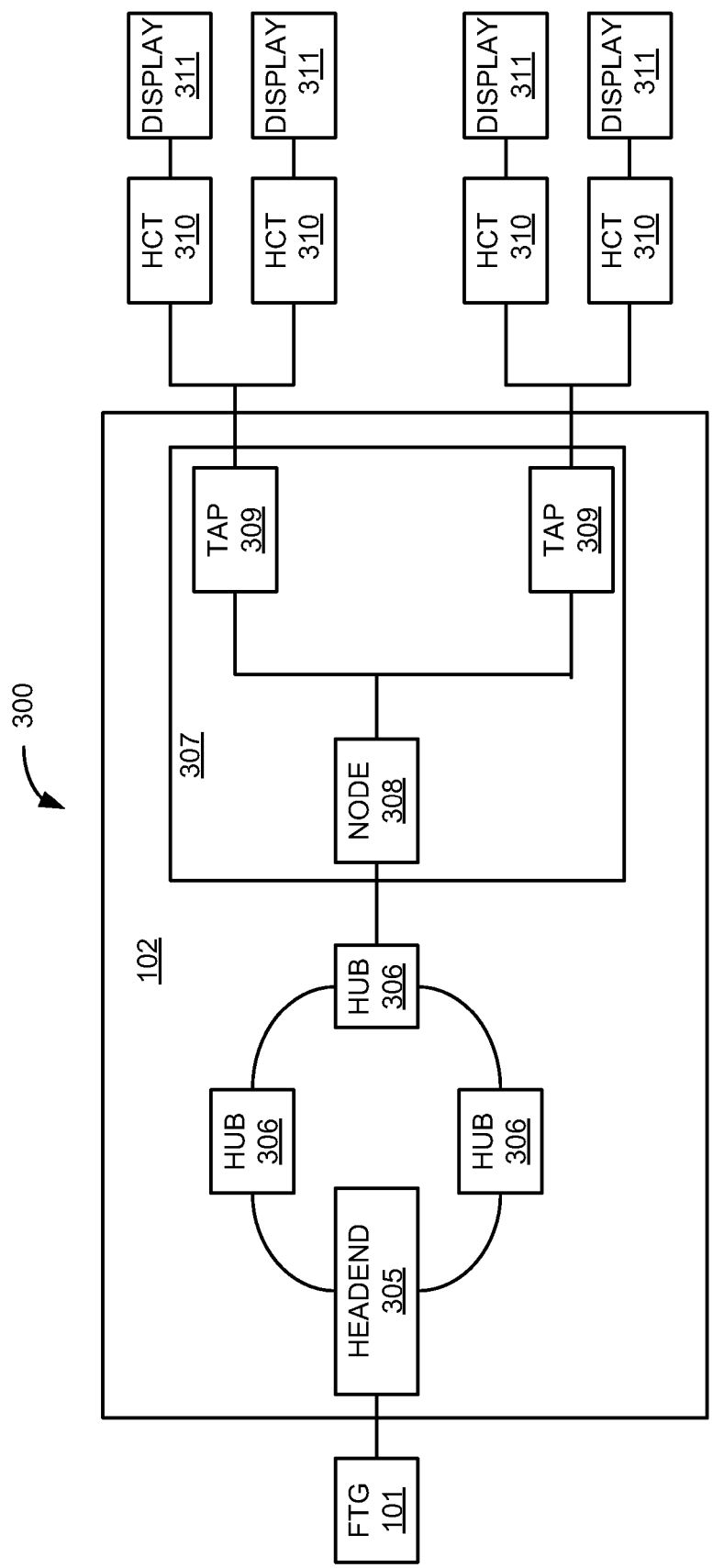
FIG. 3 is an example of a communications system of the invention in the form of a subscriber television network.

FIG. 3 shows an example system in the form of a cable television system (CTS) 300. In the example CTS 300, the transmission medium 102 is in the form of a network that includes one or more headends 305 and hubs 306 which are communicatively coupled to an access network 307. Communication devices, each in the form of a home communications terminal (HCT), are depicted by the HCTs 310. The HCT 310, most often embodied by a television STB, may be electrically coupled to at least one display device 311 such as a television or computer.

In general, the example CTS 300 is a high quality integrated network system that provides video, audio, voice and data services to subscribers. Although shown herein as a high level block diagram, it should be understood that a plurality of cable television systems can tie together a plurality of regional networks to form a global network, allowing subscribers to receive content originating anywhere in the world. The CTS 300 may broadcast both digital and analog video signals. In addition to providing one-way broadcast signals, the CTS 300 can support one-way data services as well as two-way media and data services. The two-way services allow users to request and receive Pay-per-View (PPV) programming, Near Video-on-Demand (NVOD) programming, Video-on-Demand (VOD) programming and other interactive applications such as internet and Interactive Program Guide (IPV) applications. The CTS 300 also provides the interfaces, network control, transport control, session control and servers to access content and services as well as distribute content and services to users. It should be understood that although the CTS 300 may be depicted in FIG. 3 as having a single headend 305, the CTS 300 may include a plurality of and/or alternative embodiments of the headend 305 and/or any of the illustrated components, or be configured with additional components not illustrated. Furthermore, it is noted that in some embodiments, communications identified herein as conducted between the headend 305 and the HCT 310, may actually be performed between the hub 306 and the HCT 310. It should also be understood that the CTS 300 can include a plurality of FTGs 101.

In general, a content provider (not shown) provides content to one or more headends 305, which in turn communicate the content to one or more access networks 307 for delivery to the consumer. The access network 307 can include one or more nodes 308 and taps 309. In one example of the CTS 300, fiber optic cable is used to transmit optical signals from the hub 306 to the node 308. The optical signal is converted to an RF signal at the node 308 and transmitted to the tap 309 and ultimately to the HCT 310 by coaxial cable.

As discussed above, an operator may implement different services in different operating regions. Prior art STBs were "customized" or tailored to implement only a subset of features by deliberately disabling circuits associated with the undesired features. In most cases, a fuse associated with the circuit that implemented the feature was blown to disable the circuit. Once blown, the disablement was permanent, so the particular STB could not be modified to enable the previously disabled feature. A network operator who wished to add or upgrade services to an operating region, and therefore required STBs with additional features, had to purchase an entirely new set of STBs for that region. Permanent physical feature disablement seemed the most reliable way to prevent unauthorized feature upgrades. If the STB needed only a software update to implement additional features, the feature licensor risked losing royalty payments to which he was entitled. For example, suppose circuitry for all available features is included on every STB. If a network operator desires a set of STBs in which five features are enabled, the STB manufacturer could equip the STBs with the software required to run the five desired features, and withhold the software required to run the remaining unselected features. The cost of the STBs to the operator would include the license fees for the five desired features. If additional features could be enabled by downloads of additional software, the license fees could be included in the cost of the downloads. However, it is conceivable that an operator who pays for a software upgrade for a first set of STBs could surreptitiously install the software upgrade on additional STBs as well, in which case the licensor would not receive the additional royalty payments to which he is entitled. Conversely, disablement of features by software download posed the same risk, since the software used to disable previously enabled STB features may never be received or executed at the STB, allowing the STB to continue to implement an array of features for which the operator is no longer paying. Thus, the physical disablement process seemed to be the optimum way to prevent unauthorized use of licensed features. However, while it protected licensor interests, it also precluded the future sale or leasing of particular features on the STB, thus depriving the licensor and STB manufacturer of future revenue stemming from the STB.

The example embodiments discussed herein provide systems, methods and apparatus for securely changing the enablement state of underlying hardware at a communication device, such as the HCT 310. Thus, in the case where the HCT 310 is an STB, tailoring the STB to enable a desired set of features changes from the physical disablement of undesired features as practiced in the prior art, to an electronic enablement of desired features. In a preferred example, the electronic process is a cryptographic process. In one example, a feature token is generated and transmitted by a secure machine. A secure processor at a communication device validates a received feature token and electronic enablement of features is performed in accordance with the feature token in response to the feature token being found valid. An electronic enablement process of the invention protects against unauthorized use of licensed features, while preserving opportunities for future sales of features as services are upgraded or enhanced.

In one example embodiment, the FTG 101 issues a secure feature token that is delivered to the HCT 310 via the CTS 300. The FTG 101 provides a secure means for generating a feature token having enablement status information for a feature at the HCT 310. By way of a feature token, a first set of features can be enabled at the HCT 310A in region 1, and a second set of features can be enabled at the HCT 310B in region 2. The features can be enabled at the HCT 310 in a secure manner so that the feature licensor is properly compensated for the added features. Although performed electronically over the CTS 300, the enablement process of the invention does not rely on the use of unsecured software that may be tampered with and/or pirated. A secure processor at the FTG 101 can generate a secure feature token and a secure processor at the HCT 310 can validate a received feature token. For example, a cryptographic feature token can be generated and transmitted by the FTG 101 and validated at the HCT 310. Accordingly, the enablement state of a feature at an STB can be changed in a convenient cost-effective manner that protects licensor property rights.

In a first example embodiment, the FTG 101 can generate a secure token and provide it to the headend 305 for delivery to the access network 307 and the HCT 310 for which it is intended. In one example of the invention, the FTG 101 is a secure machine, server, or communication device operated by a designated trusted authority (DTA) and equipped with the logic, software, hardware, firmware or some combination thereof to generate a secure feature token. In one example, the DTA is a particular feature licensor and the FTG 101 can generate feature tokens that enable features licensed from the particular licensor. In a further example, the DTA is the HCT 310 manufacturer, or a third-party trusted authority, and feature tokens generated by the FTG 101 can include features licensed from a plurality of licensors.

Figure 4A:
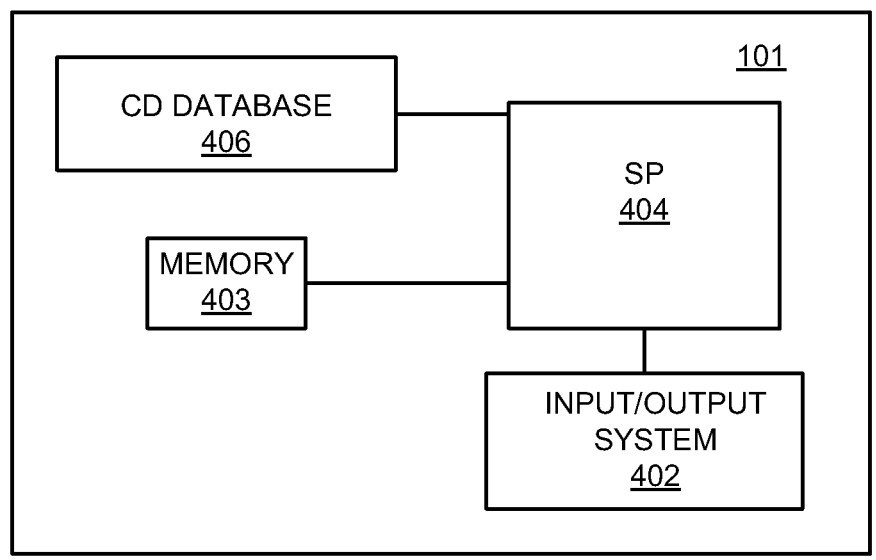
FIG. 4A is an example of a feature token generator of the invention.

Referring to FIG. 4A, an example FTG 101 can include an input/output system 402 for receiving and transmitting signals. The input/output system 402 can also be used to receive enablement status information from the DTA. The FTG 101 can be communicatively coupled to the transmission medium 102, which in an example embodiment, can be embodied by the CTS 300. An example FTG 101 can also include a secure processor 404 for generating a secure feature token, a memory 405, and a communication device (CD) database 406. Information pertaining to one or more communication devices in the communication system 300, such as the HCT 310 can be stored in the CD database 406 or the memory 405. The FTG 101 can include logic, software, firmware, and hardware designed and implemented to generate a secure feature token. The feature token generation software can be examined and validated by an independent third-party to verify that it meets the specifications necessary to protect the interests of the concerned parties, in particular, the feature licensor. Access to the FTG 101 can be limited by physical, procedural, and other restrictions as necessary to prevent malicious tampering. Periodic audits and validations can be performed to verify that the machine is operating in accordance with design objectives and remains secure.

Figure 4B:
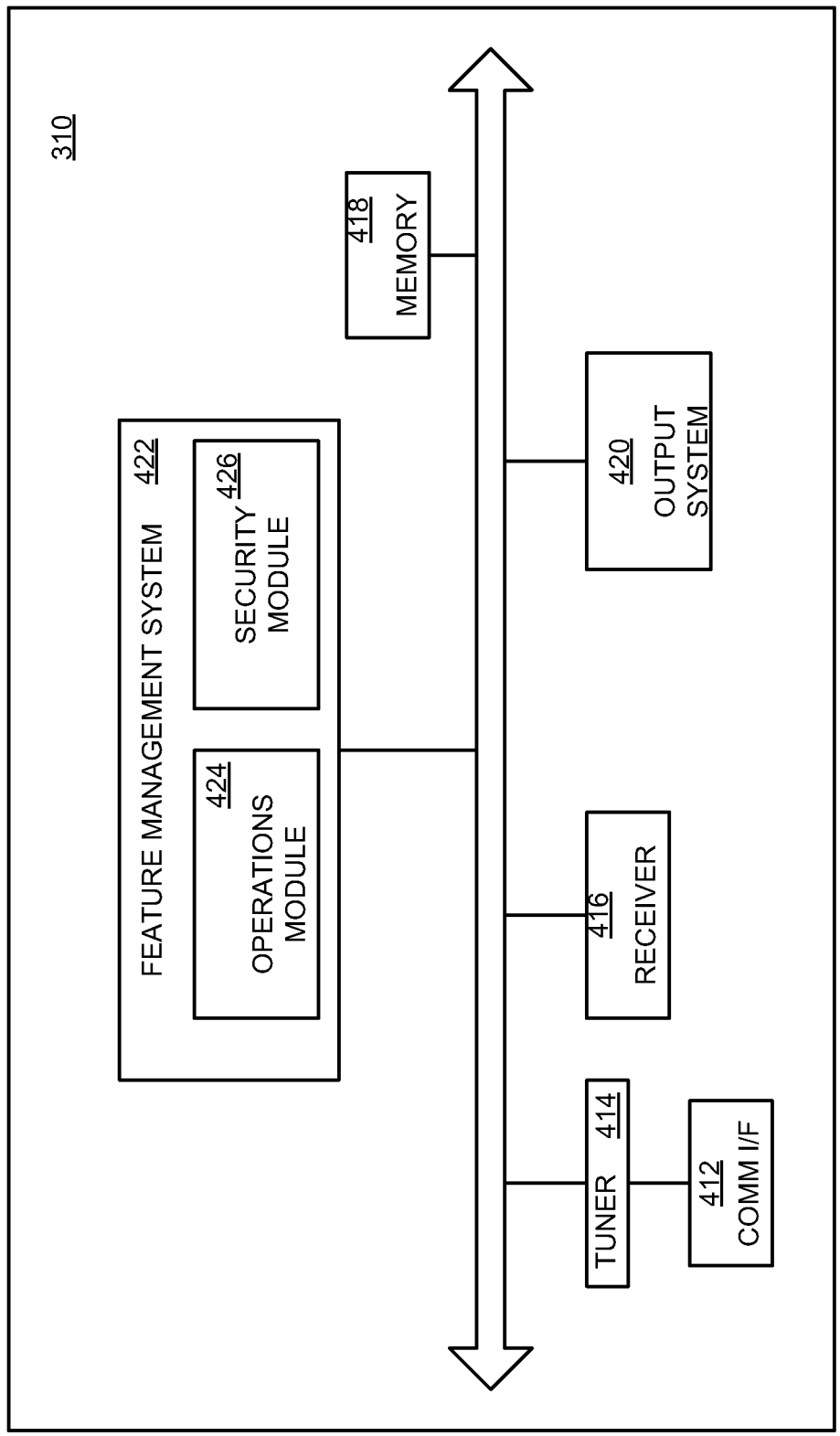
FIG. 4B is an example of a home communication terminal of the invention in the form of a television set-top box.

In one example, the secure processor 404 generates a secure feature token, and via the input/output system 602, the FTG 101 transmits the feature token to the intended HCT 310 over the CTS 300. Attention is now directed to FIG. 4B, which depicts a block diagram of one example embodiment of the HCT 310. In this example, the HCT 310 includes a communications interface 412, a tuner 414, a receiver 416, a memory 418, an output system 420 and a feature management system (FMS) 422. The communications interface 412 can receive signals, including video, audio and data signals, from the headend 305, or alternatively, the hub 106, over the access network 307. It also allows reverse communication from the HCT 310 to the headend 305 or hub 106 over the access network 307. The tuner 414 can tune to a particular television station to be displayed, and can also send and receive various types of data or media to/from the headend 305. In one example embodiment, the tuner 414 includes an out-of-band tuner for bidirectional quadrature phase shift keying (QPSK) data communication and a quadrature amplitude modulation (QAM) tuner for receiving television signals. The HCT 310 can also include the output system 420 for driving a display 111, which, in this example is a television display. Memory 418 can include flash memory, random access memory (RAM), dynamic RAM (DRAM), and other types of memory and can be used to store applications software.

Figure 5:
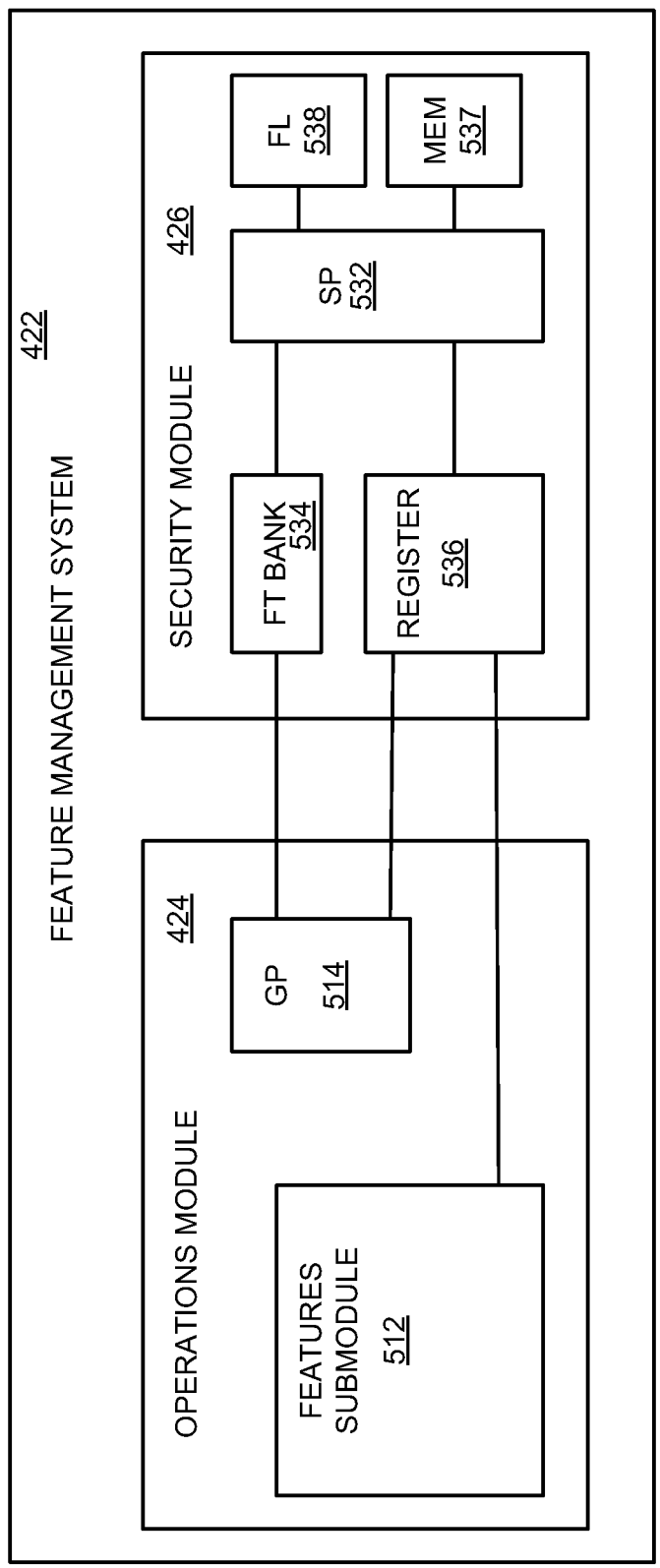
FIG. 5 is an example of a feature management system for the apparatus depicted in FIG. 4B.

The FMS 422 manages the features of the HCT 310. The term "feature" can refer to a video codec, an audio codec, a copy protection scheme, an input/output port, personal video recorder (PVR) disc capacity, or any other technology that is provided on a fee basis, that is licensed by a third-party, or is designated as a feature for which secure enablement is desired. In a first example embodiment, the FMS 422 includes an operations module 424 and a security module 426. Referring to FIG. 5, the operations module 424 can include, but is not limited to, a features submodule 512 and a general processor (GP) 514. The features submodule 512 includes the circuitry, for example ASIC circuitry, to implement the features that can be enabled on the HCT 310.

Figure 6:
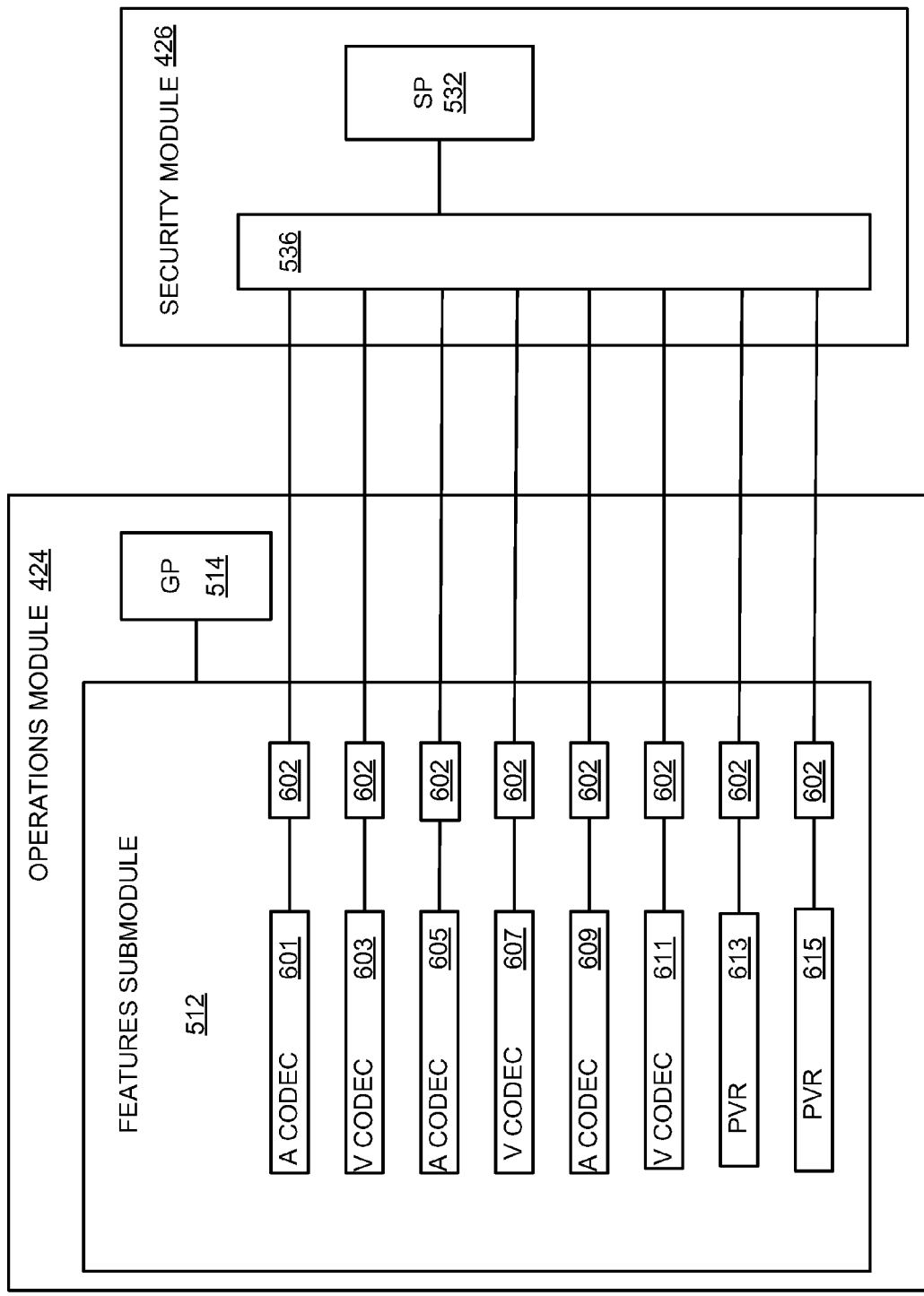
FIG. 6 is an example of an operations module for the apparatus depicted in FIG. 4B.

FIG. 6 shows a block diagram of a features submodule 512 in an example embodiment of the invention. The features submodule 512 includes circuits such as audio codec 601 and video codec 603 that can be enabled on the HCT 310. As shown in FIG. 6, the features submodule 512 can contain a plurality of encoding and/or decoding circuits, each of which can be considered a separate feature. For example, the video codec 603 can be an MPEG-2 codec, and the video codec 611 an H.264 Advanced Video Coding (AVC) codec. The features submodule 512 can also include features for which enablement is not performed via a feature token. For example, the HCT 310 can be manufactured with a set of certain basic features that are standard features, i.e. they are enabled on all STB's and are not changed by a feature token.

As shown in FIG. 6, the operations module 424 can also include a plurality of circuit controls 602. As explained more fully herein, the circuit controls 602 are elements that can be used to enable the feature circuits. For example, the circuit control 602 can be in the form of a clock, which, can start logic for the circuit, or a power on pin which supplies power to the circuit, a switch, or any other means by which operation of a circuit can be initiated and/or circuit control exercised. Although the circuit control 602 can be an integral part of the circuit, it is depicted separately to better emphasize the novel aspects of the invention. A general processor (GP) 514 can also be included in the features submodule 512 to control the operations of the HCT 310.

Referring back to the example embodiment of FIG. 5, the feature management system 422 can include a security module 426. In a first example embodiment, the security module 426 can include a secure processor 532, a feature token bank 534, a feature register 536, a memory 537, and a feature library 538. The security processor 532 and security module 426 can be included on an System on Chip (SoC) that is placed in the HCT 310 during the manufacture process. The secure processor 532 is configured to validate a feature token and can comprise hardware, software, and/or firmware, and be programmed with secure software that is tightly controlled and has been verified by an independent third-party to insure that it satisfies all specification requirements. The secure processor 532 software can be audited regularly to verify that it continues to comply with design objectives. Feature token security parameters, such as associated encryption and decryption keys can be stored in the security module 426, as well as HCT 310 identity information, so that the secure processor 532 can compare feature token information with stored information to verify the authenticity of the feature token. For example, encryption and decryption keys can be stored at the memory 537. The feature token bank 534 can be used to store a feature token received at the HCT 310. In a preferred example embodiment, the feature token bank 534 comprises non-volatile memory. As will be discussed in greater detail below, the feature register 536 contains bits that correspond to the enablement of features on the HCT 310. The secure processor 532 can write to the register 536 to change bits in accordance with a feature token. The GP 514 can be configured so that it can read the register 536, but cannot write to it. In a preferred example embodiment, the secure processor 532, via the register 536 bits, enables the feature circuitry in the features submodule 512 in accordance with the received feature token. However, it is contemplated that the secure processor 532 can alter the enablement state of features by other methods as well. The GP 514 can read the register 536 to see which features are enabled, and can thereby avoid invoking software associated with unenabled features. By using the secure processor 532 to enable features at the HCT 310, the enablement process is performed in a secure manner by a trusted processor with trusted software.

Figure 7A:
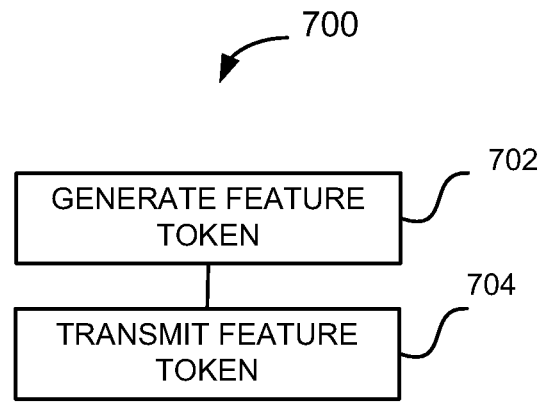
FIGS. 7A-7D depict example methods of the invention for changing feature enablement state at the apparatus depicted in FIG. 4B.

FIG. 7A shows a first example method 700 of the invention for generating and transmitting a feature token. At block 702 a secure feature token is generated. As discussed above, in an example embodiment, the secure processor 404 of the FTG 101 generates a feature token by using validated and secure hardware, software, firmware or some combination thereof. In a first example embodiment, the feature token includes communication device (CD) identity information, enablement status information for the identified communication device, and a token authorization.

In the example at hand, the CD is the HCT 310, which is in the form of a television STB. CD identity information can be retrieved from the CD database 406 for inclusion in the feature token. In one example, the feature token can include the STB chip serial number as the CD identity information, which, in this case, is the HCT identity information. Typically, an STB comprises an SoC, a single chip that combines functions that would have been implemented by a plurality of chips in the past. The SoC can comprise a very large ASIC containing almost all the functionality of the STB, although a few ASICs and/or other chips may remain outside the SoC to perform functions that are not easily or cost effectively implemented in the SoC's process technology. It is well known in the art to assign a serial number to an SoC during the manufacturing process. The serial number can be assigned randomly by machine and programmed into the chip. In one example embodiment, the CD identity information is the serial number of an SoC containing the security module 426. In a further example embodiment, HCT identity information can include one or more Media Access Control (MAC) addresses for the HCT. During the manufacture process, MAC addresses can be assigned to the HCT and stored in flash memory outside the SoC containing the ASIC.

In a first example, the enablement status information can comprise a list of features for which there is a change of status, for example, those features that were previously unenabled that are to be enabled. In a further example embodiment, the feature token lists all the features for which electronic enablement is possible and indicates an "enabled" or "nonenabled" status for each. The list of features and enablement status information can be received as input at the input/output system 402. For example a DTA may input the information, which can then be stored at the CD database 406. The SP 404 can retrieve the identity and status information from the CD database 406 to generate the feature token.

The feature token can also contain a token authorization that can be validated at the SP 532. In a first example of the invention, the authorization is in the form of a digital signature. Digital signature generation is well known in the art, and typically employs the use of public and private key pairs to encrypt and decrypt data. In a first example method of generating a digital signature, a message sender composes a message, generates a message hash or digest based on the message content, and encrypts the message hash with a private key to provide a digital signature. The message, signed with the digital signature, is transmitted to a recipient. The message recipient decrypts the signature using a public key cryptographically related to the private key to verify the authenticity of the digital signature. More details concerning the methods by which digital signatures can be generated can be obtained from: Digital Signature Standard, FIPS Publication 186-2, Federal Information Processing Standards Publication, Jan. 27, 2000 published by U.S. Department of Commerce, William M. Daley, Secretary, and National Institute of Standards Technology, Raymond G. Kammer, Director, which is hereby incorporated in its entirety by reference. The document is available at: http://csrc.nist.gov/groups/ST/toolkit/digital_signatures.html. In this first example of the invention, the FTG 101 generates a feature token that includes identity information for the HCT 310 and a list of features, as discussed above. A message digest of the feature token is also generated. The FTG 101 encrypts the message digest with a stored private key. For example, each feature may be associated with a private key assigned to the licensor, or a DTA for that feature. The encrypted message digest is added to the feature token as a digital signature. In this example embodiment, it is contemplated that the features listed within the feature token are associated with the same private key and same digital signature. However, the invention is not limited to a feature token with a single digital signature. In a further example embodiment, the feature token and message hash can be signed together in one block of an RSA algorithm.

At block 704, the FTG 101 transmits the feature token. In the example at hand the FTG 101 can transmit the feature token to the headend 305 which can deliver the feature token to the hub 106. The hub 106 can provide the feature token to the access network 307, which in turn delivers it to a communication device, in this example, the HCT 310.

Figure 7B:
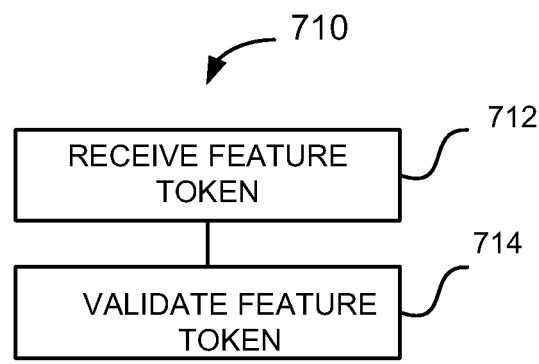

FIG. 7B depicts an example method 710 of the invention. At block 712 the feature token is received at a communication device, which, in this example, is the HCT 310. The feature token can be received at the communications interface 412 and routed to the FMS 422. In this example embodiment, the GP 514 can recognize the feature token as a feature token, but it cannot read the feature token contents. For example, the feature token can contain message header information identifying it as a feature token. The GP 514 may be able to read the message header, but be unable to read the message contents. Unlike conditional access information, which is often read and processed by a general-purpose processor at a STB to allow conditional access service, only the SP 532 can read the contents of the feature token of the invention. Denying the GP 514 the ability to read the feature token contents safeguards the feature enablement process and reduces the possibility that features can be enabled by surreptitious manipulation of the GP 514. Upon receipt of the feature token, the GP 514 can route the feature token to the feature token bank 534 which, in a first example embodiment, comprises non-volatile memory and is dedicated to the storage of received feature tokens. In one example embodiment, the GP 514 can send a notice to the SP 532 that a newly received feature token has been added to the feature token bank 534. The SP 532 can be programmed to access the feature token upon receipt of a notice of a newly arrived feature token. In a further example embodiment, the SP 532 can check for newly arrived feature tokens at periodic intervals.

Figure 7C:
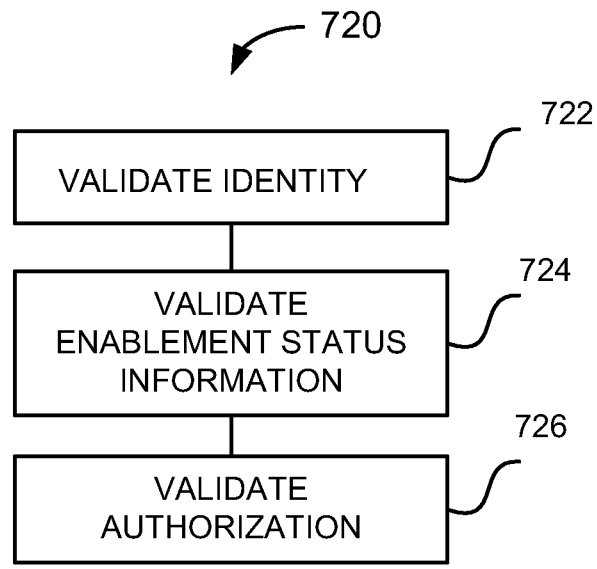

At block 714 the SP 532 validates the feature token to confirm its authenticity. FIG. 7C shows an example method 720 for validating the feature token at the SP 532. At block 722 the SP 532 validates the CD identity. In a preferred example, validating the CD identity comprises comparing the CD identity contained in the feature token to identity information at the HCT 310. The validation process can confirm that the feature token received at a communication terminal was indeed generated for the terminal at which it was received, and can also ensure that the feature token was generated by an entity having the correct identity information. As mentioned previously, the feature token includes identity information associated with the intended recipient communications terminal, in this case the HCT 310. In one example embodiment, the HCT 310 is manufactured using an SoC that contains a secure processor. A serial number is assigned to the SoC, and when the SoC is placed in the HCT 310, the HCT 310 assumes the identity of the SoC. Thus in one example, the identity information for the HCT 310 is the SoC serial number. In an example embodiment, the identity information of the HCT 310 can be stored in the security module 426. The SP 532 can compare the CD identity contained in the feature token to the stored identity information at the security module 426. If the two sets of identity information do not match, the feature token will be considered invalid, and enablement instructions ignored. If the identity information does match, the validation process continues.

At block 724, the SP 532 validates the feature enablement status information listed in the feature token. In one example, the feature enablement status information is in the form of a list of features, which are to be enabled at the HCT 310. To validate the feature status information, the SP 532 validates the list of features in the feature token. To do this, the SP 532 determines whether the features listed in the feature token can be electronically enabled at the HCT 310. In one example of the invention, the SP 532 compares the list of features contained in the feature token to those stored in the feature library 538. Only those features listed in the feature library 538 can be enabled via a feature token. A feature listed in the feature token but not stored in the feature library will not be enabled.

At block 726 the SP 532 validates the feature token authorization to confirm that the feature token is legitimate. In one example of the invention, the authorization is in the form of a digital signature that can be decrypted with a public key stored at the security module 426. In one example, the feature token lists features associated with the same public key and is signed with a single digital signature. In a further example embodiment, a feature token lists features associated with differing public keys, and includes a plurality of digital signatures. For example, a feature token listing two features authorized by a first DTA and third feature authorized by a second DTA, can include a first digital signature for the first two features, and a second digital signature associated with the third feature.

Using a feature listed in the feature token as an index, the SP 532 retrieves the public key associated with the feature from the feature library 538. For valid feature tokens, the public key associated with a feature is cryptographically related to the private key for the DTA used by the FTG 101 to encrypt the digital signature. Using the retrieved public key, the SP 532 attempts to decrypt the digital signature associated with the feature listed in the feature token. A successful decryption process indicates that the digital signature is valid.

In a first example embodiment, for each feature listed, the associated public key is retrieved from the feature library and used to attempt decryption of the digital signature. The digital signature is considered valid for the feature if successfully decrypted. In one example of a decryption process, a comparative hash is calculated over the CD identity and feature enablement status information. The comparative hash is stored at the security module 426, for example at the feature library 538 or at the memory 537. The digital signature of the feature token is decrypted by the secure processor 532 to reveal a hash. The decrypted hash is then compared to the stored comparative hash. If the comparative hash and the decrypted hash are identical, the decryption process is successful and the digital signature is considered valid. In yet a further example of a decryption process, the CD identity, feature enablement status information and hash are signed in a single block. In this example, the digital signature is decrypted to reveal a hash. Then a comparative hash is calculated over the CD identity and feature enablement status information. Again the comparative and decrypted hashes are compared to determine the authenticity of the digital signature.

It is noted that although an RSA algorithm for generating a public-private key pair has been discussed, it is contemplated that other cryptographic algorithms may also be employed in the practice of the invention. For example, an Elliptic Curve Cryptography (ECC) algorithm may be used. ECC algorithms are considered to be more resistant to malicious attack than RSA algorithms, and have the advantage of generating shorter keys for a desired level of encryption strength. Additional alternative cryptographic schemes will occur to those skilled in the art.

The feature token is used to direct the enablement status of those features for which the digital signature is determined to be valid. Those features associated with invalid digital signatures, i.e. signatures that could not be decrypted with the stored public key retrieved from the feature library 538, are not enabled in accordance with the feature token. In a further embodiment of the invention, a single failed decryption attempt dooms the entire feature token.

Thus, in one example embodiment, the feature token validation process checks the CD identity, the list of features, and the authorization of the feature token to determine its authenticity. If the feature token is found to be invalid, it is not used as a basis for feature enablement at the communication device, thus no feature enablement state is changed in response to the feature token. In one example embodiment, an invalid feature token is deleted from the feature token bank 534. In a further example embodiment, the feature token is retained in the feature token bank but is identified as invalid.

Figure 7D:
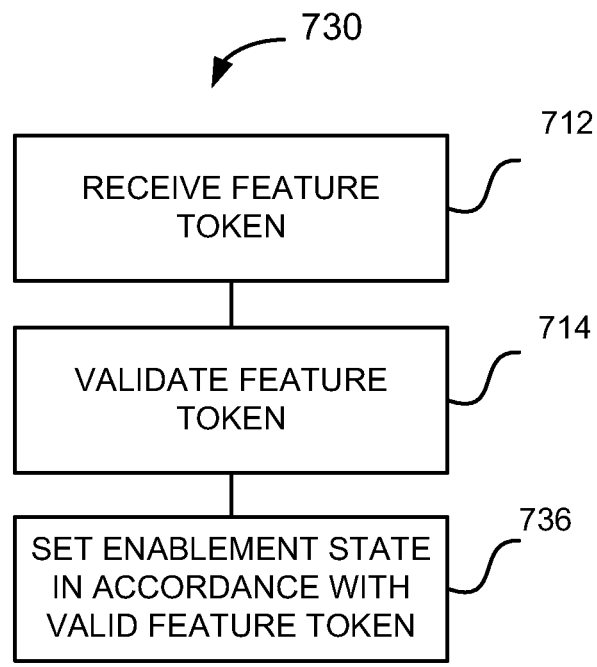

FIG. 7D shows an example method 730, which can be performed when the feature token is determined to be valid. As shown in FIG. 7D, in response to a determination that a feature token is valid, the enablement state of underlying hardware for a feature can be changed in accordance with the feature token at block 736. For example, if the feature token lists three particular features to be enabled, and the SP 532 confirms that the feature token is valid for enabling those three features, those three features are enabled at the HCT 310 at block 736 in response to the valid feature token. In one example of the invention, the SP 532 sets feature bits in the feature register 536 to change the enablement state in response to the valid feature token.

Figure 8A:
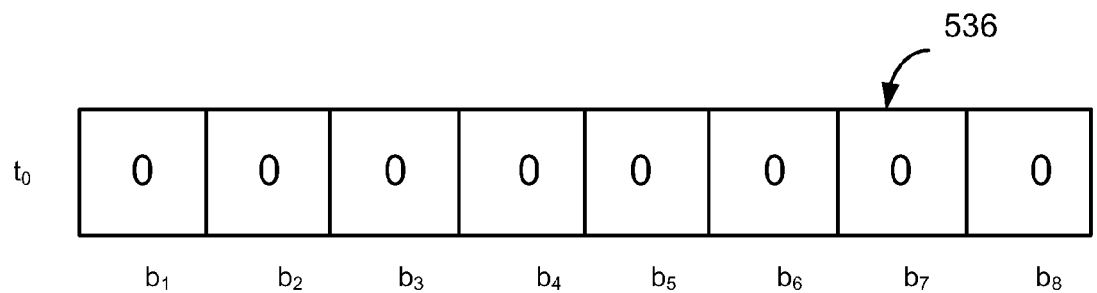
FIGS. 8A-8C show examples of a feature register for the example embodiment depicted in FIG. 5.

Attention is now drawn to FIG. 8A, which depicts an example of the register 536 at time $t_0$. As shown in the figure, the feature register 536 includes 8 feature bits, $b_1$-$b_8$. Each feature bit is associated with a particular feature at the HCT 310 so that feature bits $b_1$-$b_8$ are associated with features $f_1$-$f_8$ respectively. At $t_0$ all feature bit values are set to 0, indicating that none of the features $f_1$-$f_8$ are enabled. For example, the HCT 310 may be shipped from the manufacturer with none of the features $f_1$-$f_8$ enabled. FIG. 7B shows the feature register 536 at time $t_1$ after reception of a feature token. In the example at hand, the feature token received at the HCT 310, validated at the SP 532, and found to be valid, indicated that features $f_1$, $f_2$, $f_5$, $f_6$ and $f_7$, are to be enabled. For example, $f_1$ can be a first audio codec, $f_2$ a first video codec, $f_5$ a second audio codec, $f_6$ a second video codec, and $f_7$ a first PVR disc capacity. Accordingly, the SP 532 changes the values of the feature bits $b_1$, $b_2$, $b_5$, $b_6$ and $b_7$ from 0 to 1. In one example of the invention, the feature bits are used to directly enable the hardware-based feature. For example, the feature bits may start a clock to the logic implementing the corresponding features. The feature bit values can remain in the feature register 536 until they are changed in accordance with a subsequent feature token.

In a first example embodiment, the feature bits $b_1$-$b_7$ are cleared in the event of a power loss or a system reset. The secure processor 532 can retrieve the previously received feature tokens from the feature token bank 534 and revalidate them to restore feature bits to the register 536, and thereby reestablish the enablement states for the features $f_1$-$f_7$.

In a preferred example embodiment, the GP 514 can read the register 536, but not write to it. The GP 514 can read the register 536 to learn which features are to be enabled. This decreases the likelihood that the GP 514 will try to employ features that are not enabled, or employ any software associated with features that are not enabled at the HCT 310. Thus, annoying extended pauses caused by futile efforts to employ hardware that is not enabled can be avoided.

In a further example of the invention, instead of writing feature bits to the feature register 536, the SP 532 writes the feature bits to a memory bank (not shown) shared between the SP 532 and the GP 514. In yet a further example embodiment, the SP 532 sends the feature bits over a serial link to the GP 514. In the above embodiments the security module 426 is responsible for the feature enablement. However, it is contemplated that in further embodiments, the GP 514 can read bits set by the SP 532 and orchestrate feature enablement accordingly.

In one example embodiment, the SP 532 can verify the feature bits written to the feature register 536. The SP 536 can verify the feature bits after writing the feature bits to the feature register 536 and/or can perform periodic verifications. For example, the SP 536 can compare the feature bits in the feature register 536 to the most recent valid feature token stored in the feature token bank 534. In a further example of the invention, the SP 532 can store the results of valid feature tokens within the security module 426 and/or in other memory locations in the HCT, for example in the memory 418 (FIG. 4B). Periodic checks can be made to verify that the feature bits in the feature register 536 have values that correctly represent the results of received valid feature tokens. Storing the feature token results in a memory location outside the FMS 422 decreases the FMS 422 resistance to hardware attacks.

In one example embodiment, the HCT 310 sends an acknowledgement message to the FTG 101 confirming receipt of a feature token. For example, the acknowledgement message or confirmation receipt can originate at the SP 532 or the GP 114 and be transmitted by the HCT 310 over the CTS 300 to the FTG 101. The FTG 101 can be programmed to check for a confirmation receipt from the HCT 310. Failure to receive a confirmation receipt within a predetermined time interval can prompt the FTG 101 to re-send the feature token. A record of transmitted and acknowledged feature tokens can be maintained at the FTG 101.

In a further example embodiment, a verification process can include having the HCT 310 can query the headend 305 and/or FTG 101 at predetermined times, for example at start up and at periodic intervals during operation, to determine whether the feature token most recently received at the HCT 310 is the feature token most recently generated for the HCT 310. If it is not, the FTG 101 can be prompted to re-send the most recently generated feature token, and/or the HCT 310 can be prompted to request a re-send of the most recently generated feature token.

The examples of the invention discussed herein demonstrate methods by which the enablement state of features at an HCT can be changed in a secure manner. One of the many novel aspects of the invention is the use of a secure processor to change the enablement state of feature hardware at an HCT. Prior art STBs may use secure processors and digital certificates to conduct conditional access (CA) operations; however, prior art CA operations do not enable hardware-based features at an HCT. Although an HCT may include a CA processor with secure software for CA operations, the CA processor does not enable features at the HCT. Instead, the CA processor simply releases control words that facilitate decryption of an encrypted programming stream. The CA processor does not affect the electronic configuration of the HCT, it simply controls decryption of incoming encrypted data and programming streams. The same holds true for Internet Protocol Television (IPTV) CA. For IPTV, programming streams are turned on or off to specific HCTs. Specific features at specific HCTs are not affected. The present invention, however, employs a secure processor at the HCT to direct the enablement of features at the HCT, a process that changes the underlying state of hardware at the HCT. The enablement process is performed in a manner that can be cryptographically controlled, verified and audited to protect feature licensor interests.

The separation of labor between the SP 532 and the GP 514 is a further advantageous novel aspect of the invention. Separating the SP 532 from the GP 514, and providing the SP 532 with secure, validated and verifiable software provides a secure enablement process resistant to malicious tampering.

Furthermore, when the GP 514 can read the register 536 it is informed of the operable features at the HCT 310. Because it is aware of the underlying hardware state, the GP 514 can prevent software from attempting to run hardware features that are not enabled. Accordingly, the HCT 310 can operate in an efficient manner, avoiding time-consuming hang-ups in which the software repeatedly attempts to run features that are not enabled.

A further advantage of the invention is that HCTs can be mass-produced to enjoy economies of scale without necessitating a time-consuming permanent physical disablement process in order to provide HCTs tailored for a particular operating region. Furthermore, the same software package can be loaded onto all HCTs without worry that software associated with a disabled feature will try to run the disabled feature. The general processor on the chip can know the state of the features present on the HCT and can control the software accordingly. No longer will limited HCTs require separate limited software packages.

Figure 9A:
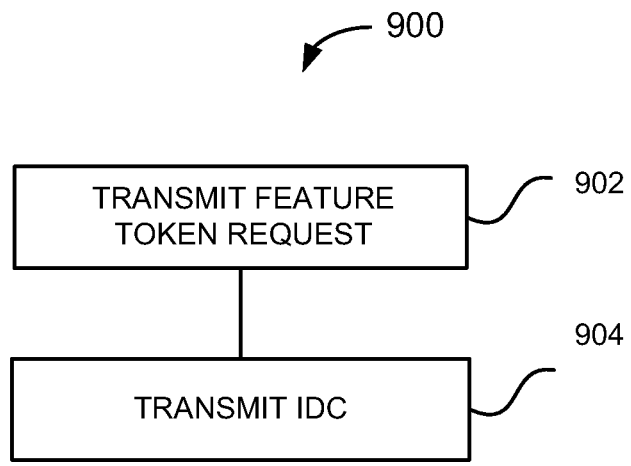
FIGS. 9A-9F depict example methods of the invention for changing feature enablement state at the apparatus depicted in FIG. 4B.

A further example method 900 of the invention is depicted in FIG. 9A. Method 900 includes an additional layer of security and auditability. In the example method 900, a communication device, in this case the HCT 310, initiates the feature token update process by transmitting a Feature Token Request (FTR) to the FTG 101 at block 902. The communication device also transmits an identity certificate (IDC) to the FTG 101 at block 904. It is contemplated that the IDC can be transmitted as part of the FTR or as a separate message. In a first example of the invention, the IDC is a signed certificate that uniquely identifies the communication device, in this case the HCT 310. For example, the IDC can be in the form of an X.509 certificate as known in the art. The IDC can be created by a Trusted Authority and be embedded in the HCT 310 at the time of manufacture or by other secure means at a later point in time. The Trusted Authority can be the HCT 310 manufacturer or other trusted third party authority.

In a first example embodiment, the IDC is embedded in the security module 426 and includes: a communication device identifier (CDID), a first CD public key (CD PUBK1), and a CD digital signature. The CDID can be information that uniquely identifies the HCT 310. By way of example, but not limitation, the CDID can be a MAC address for the HCT 310. The CD PUBK1 can be a public key that is cryptographically related to a first secret CD private key (CD PRVK1) held at the HCT 310. The asymmetric key pair comprising the CD PUBK1 and the CD PRVK1 is unique to the HCT 310. For example, the CD PUBK1 and CD PRVK1 pair can be an RSA key pair. The CD digital signature can be used to validate the authenticity of the IDC. A message digest (such as a SHA 1 digest) of the CD PUBK1, the CDID, and other IDC information can be generated. The message digest can be encrypted with a second secret CD private key (CD PRVK2) to create the CD digital signature. The secret CD PRVK2 is cryptographically related to a second CD public key (CD PUBK2) that can be used to decrypt the CD digital signature.

Figure 9B:
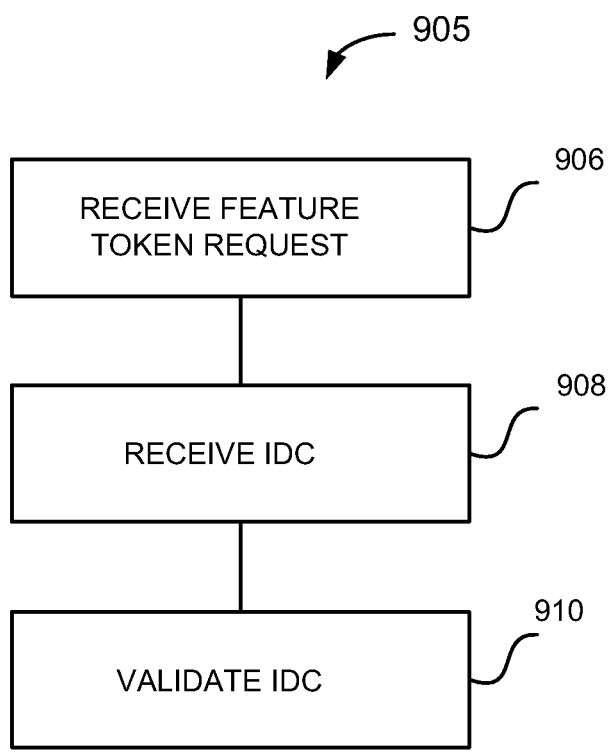

FIG. 9B shows an example method 905 that can be practiced at the FTG 101 of the present invention. At block 906 the FTG 101 can receive a feature token request. For example, the FTG 101 can receive a feature token request from the HCT 310 via the CTS 300. At block 908, the FTG 101 can receive an IDC. It is understood that although shown as separate blocks to better emphasize the novel aspects of the invention, the IDC can also be received as part of a feature token request message. At block 910 the FTG 101 can validate the IDC. In a first example, the validation process includes an attempted decryption of the CD digital signature. Using the CDID included in the IDC as an index, the FTG 101 can retrieve a stored CD PUBK2, a key that is cryptographically related to the CD PRVK2, and attempt to decrypt the CD digital signature. If the IDC is found invalid, for example, the CD digital signature cannot be decrypted with the stored CD PUBK2, no feature token is transmitted.

Figure 9C:
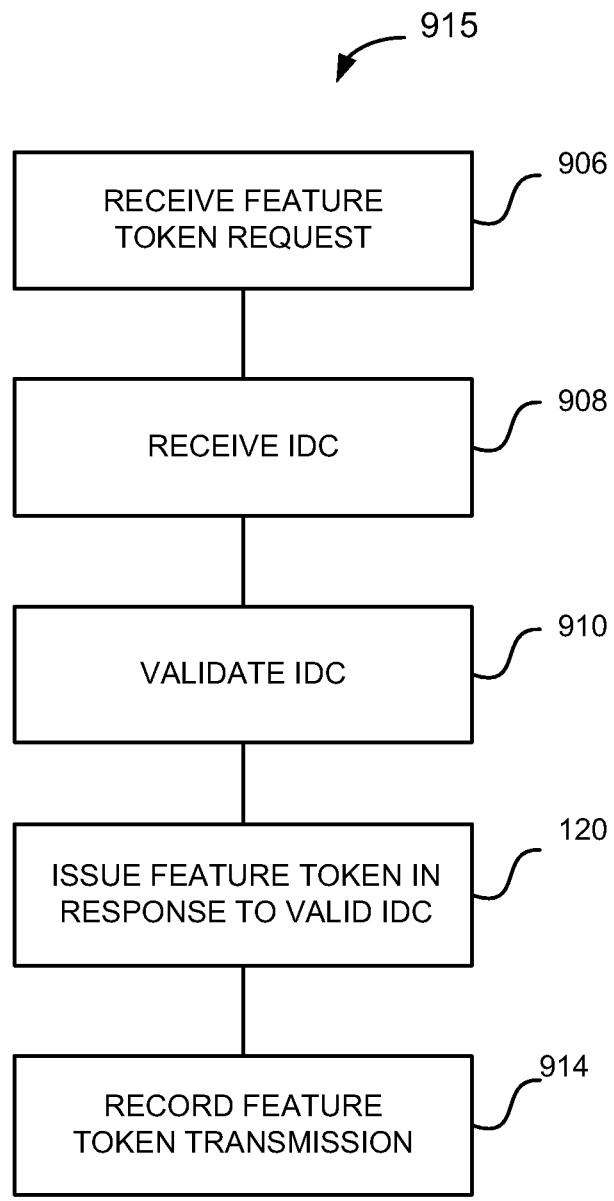

FIG. 9C illustrates a method 915 which can be practiced if the IDC is found to be valid at block 910. If the FTG 101 determines that the IDC is valid, the FTG 101 generates a feature token at block 912. In a first example embodiment of the invention, the feature token is encrypted using the CD PUBK1, which was included in the IDC sent from the HCT 310 to the FTG 101. Encryption with the CD PUBK1 ensures that only a communication device possessing the cryptographically related CD PRVK1 will be able to decrypt the feature token.

The feature token can then be sent to the HCT 310 via the CTS 300. At block 914 the FTG 101 can record that a feature token was transmitted. In a first example embodiment, the CDID included in the IDC is recorded. For example the FTG 101 can include memory, such as, but not limited to, non-volatile memory, in which CDIDs and respective feature tokens can be stored. The CDID as well as pertinent feature token parameters can be stored to provide auditable records of feature token transmissions. An example embodiment of the invention can also include recording information regarding received feature token requests for which authentication or decryption of the IDC was unsuccessful. This information may be used to track defective or rogue communication terminals.

In yet another example of the invention, the security of the cryptographic electronic enablement process is further enhanced by the addition of a validation of the feature token itself. It is noted that in the process of embedding an IDC in the HCT 310, a record can be made associating the CD identity with the SoC serial number. As mentioned previously, the FMS 422 can be formed on a single chip, for example it can be included on an SoC. A serial number is typically assigned to an SoC at the time of manufacture. A record that associates the CD identity and the SoC serial number provides a further unique identifier for the HCT 310. In addition, a message digest of the SoC serial number can be generated and associated with the CD identity for the HCT 310. A database, for example an HCT Identity Database (HID), associating the CD identity, for example MAC address, and the SoC serial number message digest for each of one or more HCTs, can be created and distributed to FTGs, such as the FTG 101, in clear text without revealing the actual SoC serial numbers. The HID can be stored at the CD database 406. Referring back to FIG. 9A, at block 902, the HCT 310 can generate and transmit a feature token request that includes a digital signature based on the SoC serial number digest. For example, the HCT 310 can take a message digest of its SoC serial number and encrypt the digest with CD PRVK1, which, as mentioned previously, is cryptographically related to CD PUBK1, which is included in the IDC transmitted to the FTG 101 at block 904.

Figure 9D:
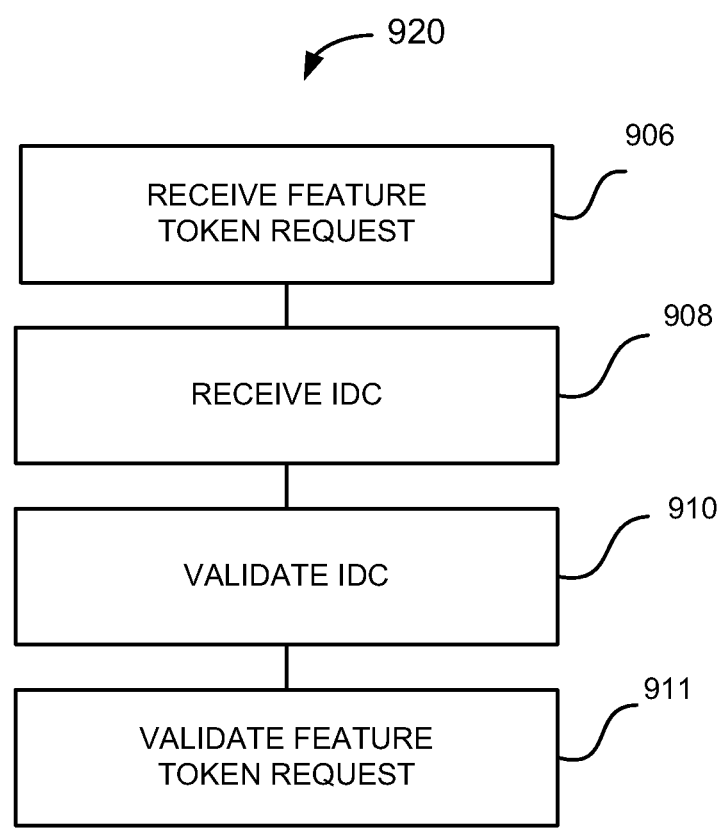
Figure 9E:
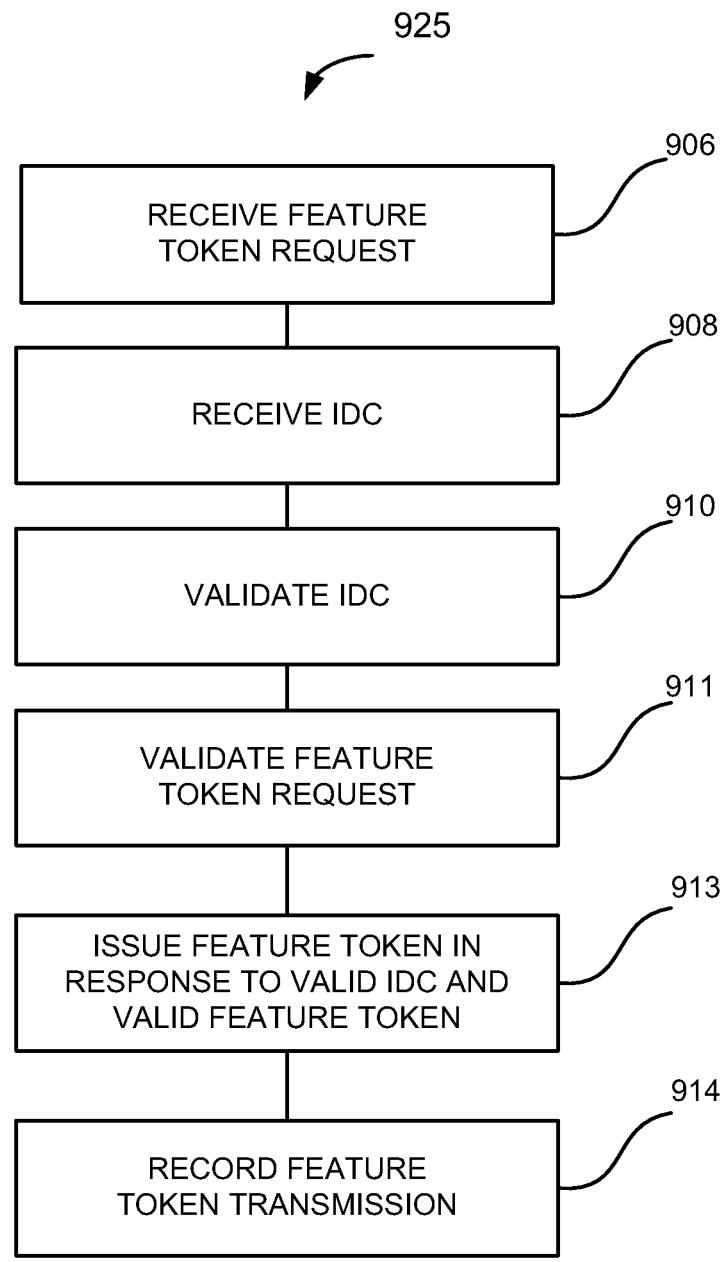

Referring now to FIG. 9D, which depicts example method 920, the FTG 101 can receive the feature token request with its encrypted digital signature at block 906 and receive the IDC with its encrypted digital signature at block 908. At block 910, the FTG 101 can validate the IDC. At block 917, the feature token itself is also validated. As shown in FIG. 9E, if both the IDC and the feature token request are found to be valid, a feature token can be issued at block 913. Issuing the feature token at block 913 includes both generating and transmitting the feature token. The feature token transmission can be recorded at block 914.

Figure 9F:
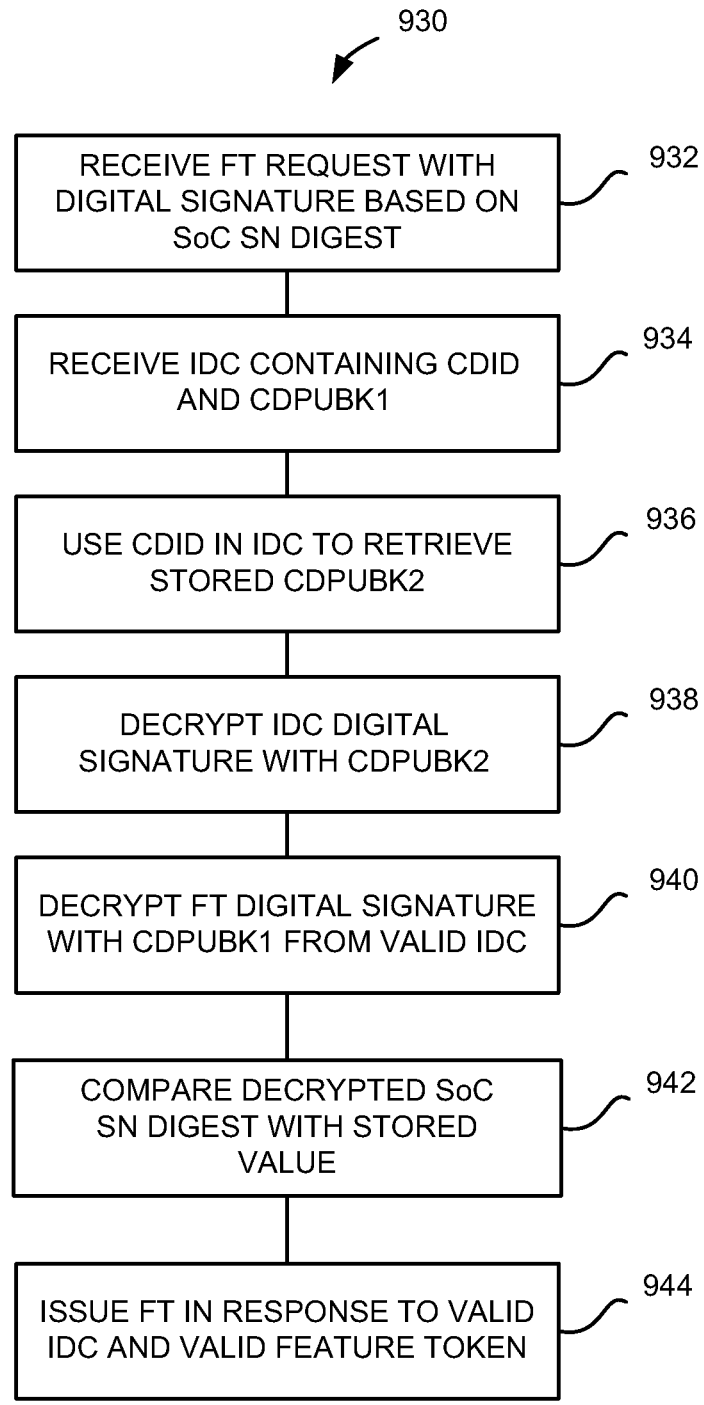

FIG. 9F shows an example method 930 which can be performed at the FTG 101 and includes example validations of the IDC and the feature token request. At block 932 the FTG 101 receives a feature token request that is signed with a digital signature generated by using a digest of the SoC serial number. At block 934, the FTG 101 receives an IDC that includes a CDID and a first public key, CD PUBK1. At block 936, the SP 404 can use the CDID from the IDC as an index to retrieve a second public key, CD PUBK2 from the CD database 406. The SP 404 can use the retrieved CD PUBK2 to attempt decryption of the IDC digital signature. If the decryption is successful, as shown at block 938, the SP 404 can attempt to decrypt the digital signature of the feature token.

In the example at hand, the FTG 101 can use the CD PUBK1 that was included in the validated IDC to attempt decryption of the feature token digital signature that has been encrypted with CD PRVK1. Since the feature token digital signature is an encrypted message digest of the HCT 310 SoC serial number, successful decryption yields the SoC serial number digest at block 940. At block 942, the FTG 101 can use the CDID from the IDC as an index to retrieve the SoC serial number digest associated with the CD identity from the HID stored at the FTG 101. If the decrypted Soc serial number digest matches the stored SoC serial number digest, the feature token request is considered valid. Thus, at block 944 a feature token can be issued in response to receiving a valid feature token request and a valid IDC. If the decrypted message digest does not match the stored digest, the feature token request is considered invalid, and no feature token is transmitted. Information pertaining to the requesting HCT 310 can be logged for further investigation. Although not shown in the figure, the method 930 can further include recording the transmission of a feature token.

Figure 10:
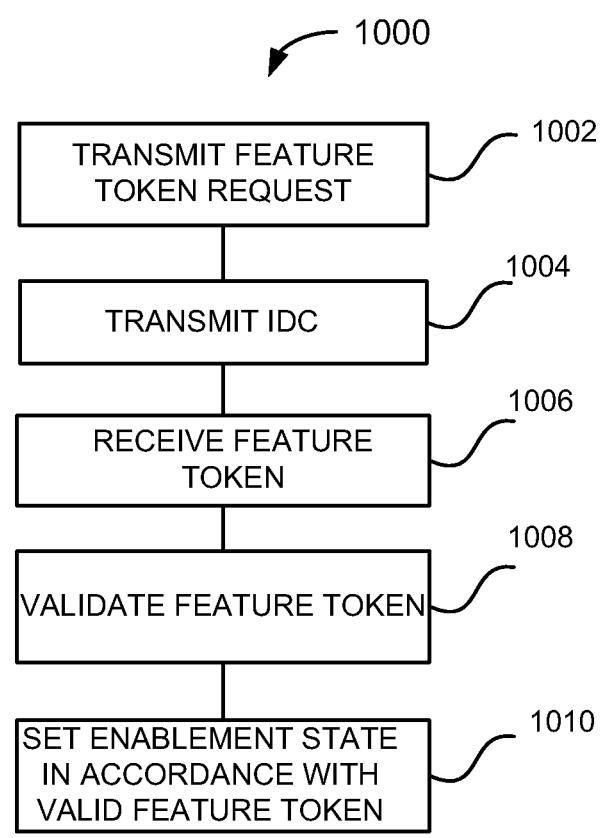
FIG. 10 depicts an example method of the invention for changing feature enablement state at the apparatus depicted in FIG. 4B.

FIG. 10 depicts a method 1000 that can be practiced at the HCT 310 in an example embodiment of the invention. As shown in FIG. 10, method 1000 begins with transmitting a feature token request at block 902, and continues with transmitting an IDC at block 904, actions that have been discussed previously herein. At block 1006, the HCT 310 can receive a feature token in response to its request. At block 1008, the feature token can be validated. For example, the validation process can be implemented as described by method 720, which was discussed above, and includes validating the identity information, the feature enablement status information and the authorization of the received feature token. When the feature token is determined to be valid, the enablement state of features at the HCT 310 is set in response to and in accordance with the feature token at block 1010.

Thus, the invention provides secure, cost-effective, cryptographic methods of feature enablement at a communication device, such as a television STB. Feature tokens can be generated by secure software at a feature token server and validated by a secure processor at the communication device. By providing a secure processor that is separated from the general processor and subject to validation, the invention provides a secure method of electronic enablement that resists malicious tampering attempts. Records of feature token transmissions can be maintained for auditing purposes, providing a record that can be reviewed by feature licensors to ensure that royalty payments are paid.

Figure 8B:
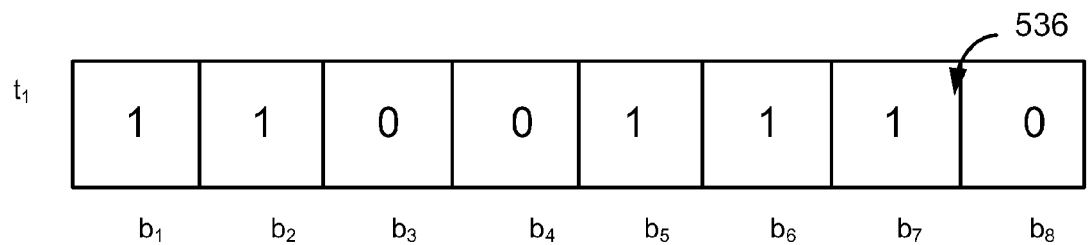
Figure 8C:
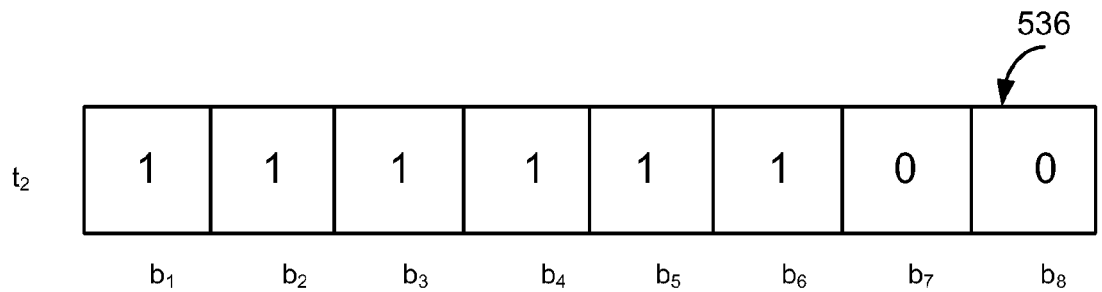

The examples above were discussed in the context of changing features at a communication device from an original unenabled state to a subsequent enabled state. However, it is contemplated that features can also be changed from a previously enabled state to a subsequent disabled state, providing more flexible operating options for system operators. Referring to FIG. 7D, at block 736 the SP 532 can enable or disable features in order to set the feature enablement state in accordance with the received feature token by setting the feature bits in the feature register 536 accordingly. For example, a feature bit $b_1$ with a first value of 1, indicating that the feature $f_1$ corresponding to the feature bit $b_1$ is enabled, can be changed to a 0, indicating that the corresponding feature $f_1$ is to be disabled. Referring to FIGS. 8B, 8C, in one example of the invention, in response to a valid feature token, the SP 532 changes the enablement state for features $f_3$, $f_4$, and $f_7$ at the HCT 310. At time $t_1$, as shown in FIG. 8B, the value of bits $b_3$ and $b_4$ are "0", indicating that features $f_3$ and $f_4$ are not enabled, and bit $b_7$ has a value of "1", indicating that feature $f_7$ is enabled. At time $t_2$, shown in FIG. 8C, the bits $b_3$ and $b_4$ have values of "1" indicating that the features $f_3$ and $f_4$ are to be changed from an unenabled state to an enabled state. The bit $b_7$ has a value of "0" at time $t_2$, indicating that feature $f_7$ is to be changed from an enabled state to an unenabled or disabled state. The control element 602 can be used to change the enablement state of feature $f_7$. For example, a clock to the logic for the feature $f_7$ can be stopped.

However, changing features from an enabled state to a disabled state can raise additional issues. For example, a communication device, such as the HCT 310, may receive a first feature token authorizing enablement of one or more features. A second feature token, authorizing disablement of particular features, may subsequently be transmitted to the HCT 310 by the FTG 101. However, the HCT 310 may not receive or process the second feature token. For example, malicious tampering at the HCT or at some other network location may prevent reception or processing of the second feature token. As a result, some features may remain enabled even though enablement is no longer authorized. To avoid this situation, additional actions can be performed to increase the likelihood that an HCT 310 operates in compliance with the most recent feature token.

In a first example, the HCT 310 can perform a status check to verify that the bit values contained in the register 536 reflect the enablement status dictated by the most recent feature token. For example, a feature token identification (FTID) can be assigned to each feature token generated by the FTG 101. In one example embodiment, the HCT 310 can transmit a status check inquiry that includes its HCT identification information as well as the FTID of the most recently received feature token. The status check query can be addressed to the headend 305, or alternatively to the FTG 101 or other designated network location. In turn, the headend 305 can query the FTG 101 to determine whether the FTID contained in the status check query represents the most recent feature token for the HCT 310. Using the HCT 310 identification information as an index, the FTG 101 can check whether the FTID contained in the status check query matches that of the feature token most recently generated for and transmitted to the HCT 310. The FTG 101 can then reply with a "YES" or "NO" answer to the HCT 310 via the CTS 300. In a first example embodiment, if the FTIDs do not match, the FTG 101 can be prompted to re-send the most recent feature token. In a second example embodiment, reception of a "NO" answer by an HCT 310 can prompt the HCT 310 to query the FTG 101 for the most recent feature token.

The example embodiments described herein provide secure electronic feature enablement at a communication device, for example, at a television set-top box. The underlying state of hardware at the STB can be changed in accordance with a feature token generated by a secure feature token generator and validated by a secure processor at the STB. Thus, STB modification can become a cryptographic enablement process as opposed to the physical disablement process practiced in the prior art. Furthermore, the modification process can be performed while the communication devices are in the field, it need not be done prior to providing the communication devices to a purchaser.

A single FTG 101 can generate individualized feature tokens for a plurality of HCTs in the CTS 300, simplifying the customization or modification process for manufacturers, network operators, and consumers. STB's intended for different operating regions no longer need to be modified at the manufacturer to prevent unauthorized use of licensed features. Instead, a network operator can purchase a single set of STBs for deployment in different operating regions. A feature token process, as discussed in the examples herein, can be used to enable a first set of features at STBs for a first operating region, and a second set of features at STBs for a second operating region. Although the enablement process is conducted electronically, it is conducted in a secure and auditable manner that guards against unauthorized use. Thus, an STB manufacturer can mass-produce STBs that have the same feature circuitry and software, reducing production costs. Network operators can pay license fees for the features that are enabled on the STBs, without having to pay for the features that will not be used in a particular operating region. Licensors will be able to audit the feature enablement process to ensure they are receiving the royalties they are due. Network operators moving STBs from a first operating region to a second operating region with additional services will not be able to use the STBs for the additional services without going through the feature token process and paying the appropriate licensing fee for enabling additional features. STBs will no longer need to be permanently disabled, therefore network operators have more flexible business options and STB manufacturers and feature licensors have the opportunity to receive additional revenue from STBs that have already been sold.

The example embodiments herein can also be used to disable previously enabled features at an STB. Furthermore, although discussed herein in the context of operator-selected features, it is contemplated a feature token enablement process can also be used to implement additional services requested by a television subscriber. For example, external hard drives on DVR boxes or the amount of recording space available to a subscriber could be artificially limited, then expanded by a feature token.

Although the invention has been discussed with respect to specific embodiments thereof, the embodiments are merely illustrative, not restrictive, of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like. In other instances, well-known structures or operations are not specifically shown or described in detail to avoid obscuring aspects of embodiments of the present invention. Reference throughout this specification to "one embodiment", "an embodiment", "example embodiment", or "specific embodiment" does not necessarily reference the same embodiment, and furthermore means that a particular feature, structure or characteristic described in connection with the embodiment is included in at least one embodiment of the present invention but not necessarily in all embodiments. Embodiments may be implemented by using a programmed general purpose processor, application specific integrated circuits, programmable logic devices, field programmable gate arrays, or by any means as is known in the art. It will also be appreciated that one or more of the elements depicted in the drawings can also be implemented in a more separated or integrated manner, or even removed as is useful in accordance with a particular application. As used in the description herein and throughout the claims that follow, "a" "an" and "the" include plural references unless the context dictates otherwise.

Thus, while the present invention has been described herein with reference to particular embodiments thereof, a latitude of modifications, various changes and substitutions is intended in the foregoing descriptions. It is understood that the invention is not to be limited to the particular terms used in the following claims, but that the invention will include any and all embodiments and equivalents falling within the scope of the appended claims.

What is claimed is:

1. An apparatus, comprising:
a plurality of hardware components realizing a plurality of pre-defined features of the apparatus, wherein at least some of the plurality of hardware components are disabled so as to disable corresponding features in the plurality of features;
a digital feature register recording enablement state of each one of the plurality of hardware components;
a secure processor operable to execute machine-readable instructions to perform operations comprising:
   validating a received feature token specifying an authorization to change the enablement state of at least one particular hardware component in the plurality of hardware components to enable at least one particular feature in the plurality of features realized by the particular hardware component; and
   changing the enablement state of the particular hardware component, based at least in part on the received feature token and in response to validating the received feature token; and
a general purpose processor controlling access to the plurality of hardware components and operable to execute machine-readable instructions to perform operations comprising:
   receiving a software request to access the particular hardware component; and
   determining whether the particular hardware component is enabled by reading the digital feature register;
wherein the digital feature register is writable to only by the secure processor and the general purpose processor has direct read-only access to the digital feature register and the enablement state of the particular feature can both be toggled from an enabled state to an unenabled state and from an unenabled state to an enabled state in response to received feature tokens authorizing a change in state of the enablement status of the particular feature.

2. The apparatus of claim 1, wherein the digital feature register includes a plurality of binary bit values, each bit value representing the respective enablement status of a respective feature in the plurality of features, and modifying at least one value stored in the digital feature register includes toggling a particular binary bit value in the register corresponding to the particular feature, wherein toggling the particular binary bit value of the particular feature toggles the enablement status of the particular hardware component, and each of the one or more hardware components is directly enabled or disabled based on the bit value corresponding to the hardware component in the digital feature register.

3. The apparatus of claim 1, wherein the apparatus is a television set-top box.

4. The apparatus of claim 1, wherein said secure processor is configured to change said the enablement state of the particular hardware component from an unenabled state to an enabled state and from an enabled state to an unenabled state.

5. The apparatus of claim 1, wherein at least a particular one of the disabled hardware components is disabled by disabling a clock signal to the particular hardware component based on a corresponding value of the digital feature register.

6. A method, comprising:
receiving a feature token at a communication device including at least one general purpose processor and at least one secure processor, the communication device configured to possess a pre-defined plurality of features realized by one or more hardware components of the communication device, each feature in the plurality of features having an enablement status defining whether a respective underlying hardware component in the one or more hardware components is enabled so as to enable the respective feature, a subset of the pre-defined plurality of features being initially disabled, wherein:
the feature token includes feature enablement status information specifying an authorization to change the enablement status of at least one particular feature in the plurality of features and the feature token is encrypted, and
the enablement status of each feature is stored in a digital feature register, wherein the digital feature register is writable to only by the secure processor and the general purpose processor has read-only access to the digital feature register;
validating the feature token at the secure processor, wherein validating the received feature token includes successfully decrypting the feature token using the at least one secure processor;
modifying at least one value stored in the digital feature register to toggle the enablement status of the particular feature based on the feature enablement status information; and
using the general purpose processor to determine whether the particular hardware component is enabled by reading the digital feature register, wherein the digital feature register is directly read by the general purpose processor;
wherein the enablement state of the particular feature can both be toggled from an enabled state to an unenabled state and from an unenabled state to an enabled state in response to received feature tokens authorizing a change in state of the enablement status of the particular feature.

7. The method of claim 6, wherein said validating said feature token comprises validating communication device identity information and feature token authorization information contained within the feature token.

8. The method of claim 6, wherein the digital feature register includes a plurality of binary bit values, each bit value representing the respective enablement status of a respective feature in the plurality of features, and modifying at least one value stored in the digital feature register includes toggling a particular binary bit value in the register corresponding to the particular feature, wherein toggling the particular binary bit value of the particular feature toggles the enablement status of the particular hardware component.

9. The method of claim 6, wherein the enablement status of the particular feature is toggled from disabled to enabled, the method further comprising:
receiving a second feature token specifying that the particular feature is to be disabled;
validating the second feature token at the secure processor; and
modifying, using the secure processor, the at least one value stored in the digital feature register to toggle the enablement status of the particular feature from an enabled state to a disabled state.

10. The method of claim 6, wherein validating the feature token includes identifying whether the at least one particular feature is included in the pre-defined plurality of features of the communication device.

11. A method, comprising:
transmitting, from a communication device to a remote server device, a feature token request for feature enablement status information for a communication device, wherein:
the feature token request includes an identity certificate for the communication device including a message digest encrypted using a first private key paired to a first public key, the message digest including a second public key, paired to a second private key, and an identifier of the communication device, and
the communication device is configured to possess a pre-defined plurality of features realized by one or more hardware components of the communication device, each feature in the plurality of features having an enablement state defining whether a respective underlying hardware component in the one or more hardware components is enabled so as to enable the respective feature, a subset of the pre-defined plurality of features being initially disabled;
receiving a particular feature token including feature enablement status information communicating an authorization to change the enablement state of at least one particular feature in the plurality of features, wherein the particular feature token is encrypted;
validating the received particular feature token by successfully decrypting the particular feature token using the second private key; and
changing a corresponding value of a feature register to change the enablement state of the at least one particular feature based, at least in part, on the particular feature token, wherein bits of the feature register are writable to only by the secure processor and the general purpose processor has direct read-only access to the feature register.

12. The method of claim 11, wherein the communication device transmits the feature token request.

13. The method of claim 11, wherein said enablement state is changed from an unenabled state to an enabled state.

14. A method, comprising:
receiving a feature token request from a remote computing device;
identifying, using at least one processing device, an identity certificate included in the feature token request, the identity certificate containing identity information for a communication device and including a message digest encrypted using a first private key paired to a first public key, the message digest including a second public key, paired to a second private key, and an identifier of the communication device;
validating, using at least one processing device, the identity certificate by successfully decrypting the message digest using the first public key;
generating, using at least one processing device, a feature token in response to validating the identity certificate, the feature token authorizing enablement of a particular one of a plurality of hardware-implemented features pre-configured on the communication device, wherein each of the plurality of features on the communication device has an enablement state and enablement states of the features can both be toggled from an enabled state to an unenabled state and from an unenabled state to an enabled state in response to received feature tokens;

encrypting, using at least one processing device, the feature token using the second public key; and transmitting the encrypted feature token to the remote communication device.

15. The method of claim 14, wherein the second public key is associated with the communication device.

16. The method of claim 14, further comprising validating the feature token request.

17. The method of claim 16, wherein validating the feature token request includes successfully decrypting the message digest using the first public key.

18. The method of claim 14, wherein use of the particular hardware feature is subject to a license and the enablement of the particular hardware feature is based at least in part on terms of the license.

19. The method of claim 18, wherein the license terms correspond to a particular geographical region.

20. The method of claim 18, further comprising storing a record of the enablement of the particular hardware feature for use in auditing the license.

21. The method of claim 14, further comprising identifying the first public key, from a plurality of stored public keys, as associated with the communication device.

22. The method of claim 21, wherein the identity certificate includes an unencrypted identifier and the unencrypted identifier is used to identify the first public key from the plurality of stored public keys.

23. The method of claim 14, wherein the communication device is a particular one of a plurality of communication devices and the generated feature token is customized for the particular communication device.

24. Logic encoded in non-transitory media that includes code for execution and when executed by a processor is operable to perform operations comprising:

receiving a feature token request from a remote computing device;

identifying an identity certificate included in the feature token request, the identity certificate containing identity information for a communication device and including a message digest encrypted using a first private key paired to a first public key, the message digest including a second public key, paired to a second private key, and an identifier of the communication device;

validating the identity certificate by successfully decrypting the message digest using the first public key;

generating a feature token in response to validating the identity certificate, the feature token authorizing enablement of a particular one of a plurality of hardware-implemented features pre-configured on the communication device, wherein each of the plurality of features on the communication device has an enablement state and enablement states of the features can both be toggled from an enabled state to an unenabled state and from an unenabled state to an enabled state in response to received feature tokens;

encrypting the feature token using the second public key; and transmitting the encrypted feature token to the communication device.

25. Logic encoded in non-transitory media that includes code for execution and when executed by a processor is operable to perform operations comprising:

transmitting, from a communication device to a remote server device, a feature token request for feature enablement status information for a communication device, wherein:

the feature token request includes an identity certificate for the communication device including a message digest encrypted using a first private key paired to a first public key, the message digest including a second public key, paired to a second private key, and an identifier of the communication device, and the communication device is configured to possess a pre-defined plurality of features realized by one or more hardware components of the communication device, each feature in the plurality of features having an enablement state defining whether a respective underlying hardware component in the one or more hardware components is enabled so as to enable the respective feature, a subset of the pre-defined plurality of features being initially disabled;

receiving a particular feature token including feature enablement status information communicating an authorization to change the enablement state of at least one particular feature in the plurality of features, wherein the particular feature token is encrypted;

validating the received particular feature token by successfully decrypting the particular feature token using the second private key; and changing a corresponding value of a feature register to change the enablement state of the at least one particular feature based, at least in part, on the particular feature token, wherein bits of the feature register are writable to only by the secure processor and the general purpose processor has direct read-only access to the feature register.

26. A method, comprising:

transmitting, from a communication device to a remote server device, a feature token request for feature enablement status information for a communication device, wherein:

the feature token request includes an identity certificate for the communication device including a message digest encrypted using a first private key paired to a first public key, the message digest including a second public key, paired to a second private key, and an identifier of the communication device, the communication device includes at least one general purpose processor and at least one secure processor and is configured to possess a pre-defined plurality of features realized by one or more hardware components of the communication device, each feature in the plurality of features having an enablement state defining whether a respective underlying hardware component in the one or more hardware components is enabled so as to enable the respective feature, a subset of the pre-defined plurality of features being initially disabled, and the enablement state of each feature is stored in a digital feature register, wherein the digital feature register is writable to only by the secure processor and the general purpose processor has direct read-only access to the digital feature register;

receiving, in response to the feature token request, a particular feature token including feature enablement status information communicating an authorization to change the enablement state of at least one particular feature in the plurality of features, wherein the particular feature token is encrypted;

validating, using the secure processor, the received particular feature token by successfully decrypting the particular feature token using the second private key;

modifying, in response to validating the particular feature token, at least one value stored in the digital feature register to toggle the enablement state of the particular feature based on the feature enablement status information; and using the general purpose processor to determine whether the particular hardware component is enabled by reading the digital feature register;

wherein the enablement state of the particular feature can both be toggled from an enabled state to an unenabled state and from an unenabled state to an enabled state in response to received feature tokens authorizing a change in state of the enablement status of the particular feature.

* * * * *